United States Patent [19]

Chang et al.

[11] Patent Number: 4,582,892

[45] Date of Patent: Apr. 15, 1986

[54] PROCESS FOR THE PREPARATION OF EPOXY RESINS

[75] Inventors: Feng-chih Chang, Lake Jackson; Michael L. Heather, Angleton; Robert P. Shirtum, Freeport; Robert L. Hearn, Jr., Angleton, all of Tex.

[73] Assignee: The Dow Chemical Company, Midland, Mich.

[21] Appl. No.: 737,955

[22] Filed: May 28, 1985

[51] Int. Cl.$^4$ .................... C08G 59/06; C08G 59/08
[52] U.S. Cl. .................................. 528/93; 525/507; 528/94; 549/517
[58] Field of Search ................ 528/93, 94; 525/507; 549/517

[56] References Cited

U.S. PATENT DOCUMENTS

| | | | |
|---|---|---|---|
| 2,848,435 | 8/1958 | Griffin et al. | 260/47 |
| 2,943,096 | 6/1960 | Reinking | 260/348.6 |
| 3,121,727 | 2/1964 | Baliker, Jr. et al. | 260/348.6 |
| 3,221,032 | 11/1965 | Price et al. | 260/348.6 |
| 3,372,142 | 3/1968 | Smith | 528/93 |
| 4,017,523 | 4/1977 | Vargiu et al. | 260/348.6 |
| 4,273,915 | 6/1981 | Soula et al. | 528/93 |
| 4,313,886 | 2/1982 | Massingill | 260/348.15 |
| 4,390,680 | 6/1983 | Nelson | 528/97 |
| 4,499,255 | 2/1985 | Wang et al. | 528/95 |

FOREIGN PATENT DOCUMENTS 2001991 2/1979 United Kingdom .

*Primary Examiner*—Earl Nielsen
*Attorney, Agent, or Firm*—J. G. Carter

[57] ABSTRACT

Epoxy resins are prepared by dehydrohalogenating the reaction product of a polyhydric phenol with an excess of an epihalohydrin in the presence of a quaternary ammonium compound wherein prior to dehydrohalogenation, the excess epihalohydrin is removed and an organic solvent is added and at least a portion of the dehydrohalogenation is conducted in the presence of added quantities of a quaternary ammonium compound.

9 Claims, No Drawings

PROCESS FOR THE PREPARATION OF EPOXY RESINS

BACKGROUND OF THE INVENTION

The present invention is directed to an improved process for the preparation of epoxy resins.

Methods mostly mentioned in the literature concerning the preparation of epoxy resin employ caustic alkali catalyst. The insolubility of the phenolate from the caustic-bisphenol-epichlorohydrin coupling process normally requires a large quantity of water and organic solvent to maintain a single-phase operation. Another preparation method (U.S. Pat. No. 3,221,032) proposes to eliminate the solubility problem attributable to phenolate formation by catalyzing the coupling of epichlorohydrin and polyhydric phenol with quaternary ammonium catalyst instead of the conventional caustic catalyst. The dehydrochlorination is then carried out at a relatively high temperature in the presence of epichlorohydrin. To increase epichlorohydrin yield, it has been proposed (U.S. Pat. No. 2,943,096) that removal of the unreacted epichlorohydrin from the coupled intermediate be performed prior to dehydrochlorination of the resin chlorohydrin which would then be carried out in a mixture of solvents other than epichlorohydrin. The disadvantages of this process are undesirable product viscosities and the need to use a mixture of water-soluble and water-insoluble solvents to achieve dehydrochlorination at a rapid enough rate to be practical. Additionally, product viscosity control in the 9,000-10,000 cps range has previously required additional process steps (i.e., addition of seed resin, double charging of reactants to the coupling reaction, and post addition of a polyhydric alcohol following dehydrochlorination). The present invention describes a process which significantly eliminates the disadvantages and retains most all of the advantages of a non-caustic catalyzed process. Consistent product viscosity and adjustment without additional process steps in achieved by control of the unreacted phenolic OH content in the coupled intermediate prior to dehydrohalogenation, thus minimizing and controlling viscosity building oligomers and high resin bound chloride species. The remaining required product oligomers contributing to viscosity control are formed during dehydrochlorination without significant additional buildup of bound chloride. This processing method allows for flexible viscosity control while maintaining a low chloride product.

SUMMARY OF THE INVENTION

The present invention pertains to an improved process for preparing epoxy resins by (A) reacting at least one polyhydric phenol with an excess of at least one epihalohydrin in the presence of at least one quaternary ammonium catalyst thereby producing a halohydrin intermediate; (B) removing the excess epihalohydrin from said intermediate; (C) adding an organic solvent or mixture of solvents to the resultant intermediate; (D) dehydrohalogenating the intermediate in the presence of said solvent or solvent mixture and (E) thereafter recovering the resultant epoxy resin; wherein the improvement resides in (1) conducting step (A) at a temperature below the decomposition temperature of the quaternary ammonium catalyst and for a time sufficient to provide a phenolic hydroxyl conversion of from about 90 to about 99.99, preferably from about 95 to about 99 percent; (2) removing substantial quantities of said quaternary ammonium catalyst from the reaction mixture prior to the removal of the excess epihalohydrin and (3) conducting at least a portion of the dehydrohalogenation reaction, step (D), in the presence of added quantities of quaternary ammonium compound in an amount of from about 0.0001 to about 0.02, preferably from about 0.002 to about 0.008 part by weight per one part by weight of organic feed.

DETAILED DESCRIPTION OF THE INVENTION

Suitable polyhydric phenols which can be employed herein include, for example, those mononuclear and polynuclear polyhydric phenols represented by the formulas

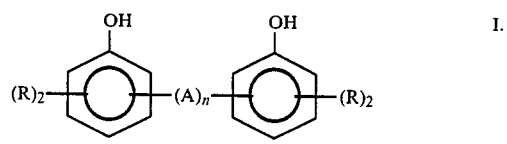

I.

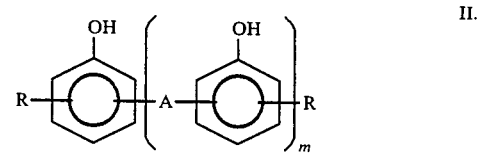

II.

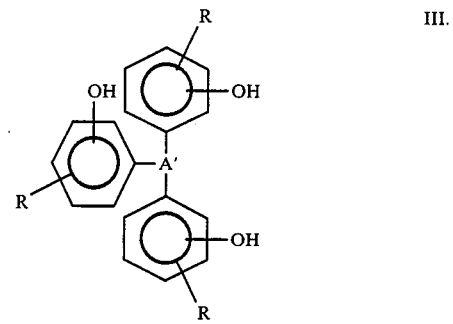

III.

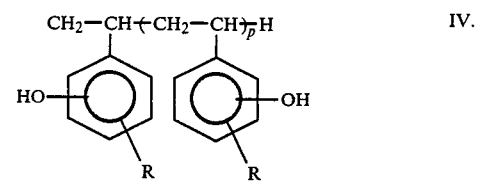

IV.

wherein each A is independently a divalent hydrocarbon group having from 1 to about 12, preferably from 1 to about 6 carbon atoms,

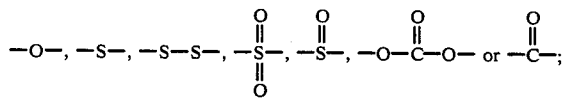

A' is a trivalent hydrocarbon group having from 1 to about 12, preferably from 1 to about 6, carbon atoms; each R is independently hydrogen, a hydrocarbyl group having from 1 to about 10, preferably from 1 to about 4, carbon atoms, a halogen atom, preferably chlorine or bromine, or a hydroxyl group; p has a value of from about 1 to about 100, preferably from about 2 to about 50; m has a value from about 1 to about 6 and n has a value of zero or 1.

Also suitable as polyhydric phenols are those represented by the formulas

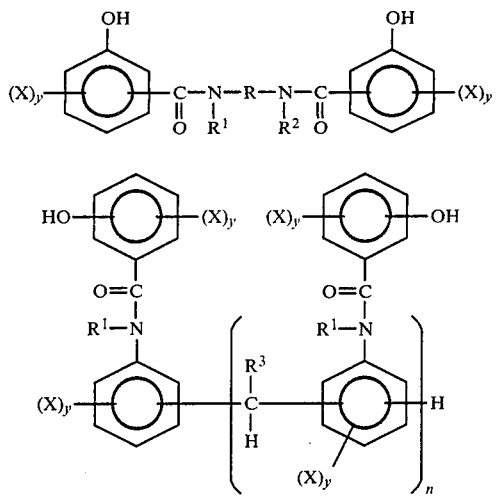

wherein each R is a divalent hydrocarbyl group having from 1 to about 18, preferably from about 2 to about 12 and most preferably from about 2 to about 6 carbon atoms, a group represented by the following formulas VII, VIII, IX or X

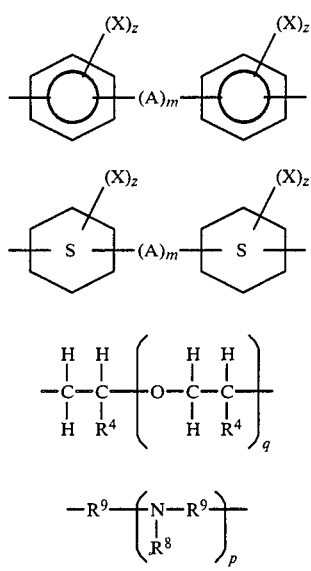

or R can combine with $R^1$ so as to form a stable heterocyclic ring with the nitrogen atoms; each A is independently a divalent hydrocarbyl group having from 1 to about 10, preferably from 1 to about four carbon atoms,

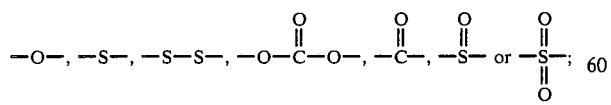

each $R^1$ is independently hydrogen, a 2,3-epoxypropyl group, a 2-alkyl-2,3-epoxypropyl group, a monovalent hydrocarbyl group or a hydroxyl substituted monovalent hydrocarbyl group, said hydrocarbyl groups having from 1 to about 9 carbon atoms, said alkyl having from 1 to about 4, preferably 1 to about 3 carbon atoms; each $R^2$ is independently hydrogen or an alkyl group having from 1 to about 4, preferably 1 to about 3 carbon atoms; each $R^3$ is independently hydrogen or an alkyl group having from 1 to about 4 carbon atoms; each $R^4$ is independently hydrogen, a hydrocarbyl or halogen substituted hydrocarbyl group having from 1 to about 9, preferably from 1 to about 2 carbon atoms; each $R_8$ is independently selected from the group represented by formula XIV or the same groups as $R^1$ except that $R^8$ cannot be a hydrogen; each $R^9$ is independently a divalent hydrocarbyl group having from 2 to about 4, preferably 2 carbon atoms; each X is independently hydrogen, chlorine, bromine or a hydrocarbyl or hydrocarbyloxy group having from 1 to about 9, preferably 1 to about 6 carbon atoms; each m independently has a value of zero or 1; n has an average value of from about 0.01 to about 6, preferably 0.1 to about 4; p has an average value of from 1 to about 10, preferably from 1 to about 3; q has an average value of at least 1, preferably from 1 to about 150, most preferably from 1 to about 100 and usually from 1 to about 10 and each y and z independently has a value of 1 to 2.

Also suitable are polycyclopentadiene polyphenols represented by the formula

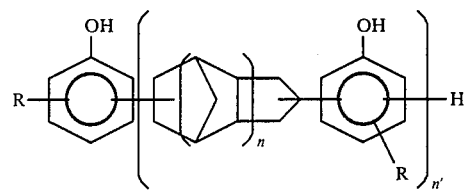

wherein each R is independently hydrogen, a hydrocarbyl group having from 1 to about 10, preferably from 1 to about 4 carbon atoms, a halogen atom, preferably chlorine or bromine or a hydroxyl group or an amino group; n has a value from 1 to about 5; and n' has a value of from about 1 to about 10, preferably from 3 to about 6.

Suitable such polycyclopentadiene polyphenols and methods for their preparation can be found in U.S. Pat. No. 4,390,680 issued to Donald L. Nelson on June 28, 1983 which is incorporated herein by reference.

Suitable epihalohydrins which can be employed herein include those represented by the following formula

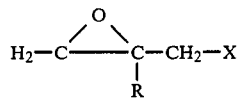

wherein R is hydrogen or a hydrocarbyl group having from 1 to about 4 carbon atoms and X is a halogen, preferably chlorine or bromine.

The epihalohydrin and the polyhydric phenol compound are employed in a molar ratio of from about 3:1 to about 30:1, preferably from about 6:1 to about 12:1, respectively.

Suitable dehydrohalogenating agents which can be employed herein include alkali metal hydroxides such as, for example, sodium hydroxide, potassium hydroxide, lithium hydroxide or mixtures thereof.

The alkali metal hydroxide can be added either continuously or incrementally, but never is all of the alkali metal hydroxide added in one increment.

Suitable solvents which can be employed herein include ketones, aromatic hydrocarbons, halogenated aliphatic compounds such as, for example, methyl isobutyl ketone, methyl ethyl ketone, toluene, xylene, methylene chloride, ethylene dichloride, mixtures thereof and the like.

The amount of solvent which is employed will depend on the particular solvent and phenolic hydroxyl compound being employed. The solvent generally ranges from about 40 to about 80 weight percent, preferably from about 55 to about 65 weight percent based on the total weight of solvent and intermediate product.

The amount of catalyst employed in the coupling reaction is any quantity which will suitably catalyze the reaction between the polyhydric phenol and epihalohydrin. Usually, quantities of from about 0.005 to about 0.15 mole of catalyst per mole of polyhydric phenol is employed with from about 0.01 to about 0.02 mole being preferred.

The coupling reaction is usually conducted at a temperature of from about 35° to about 110° C., preferably from about 40° C. to about 70° C. Higher temperatures tend to produce undesirable by products and β-chlorohydrin intermediate product instead of the more desirable α-chlorohydrin intermediate product.

The excess epihalohydrin and glyceroldihalohydrin should be removed at the lowest temperature, time without causing an adverse increase in residual amounts of epihalohydrin and glycerol dihalide in the intermediate product which is subsequently mixed with solvent and dehydrohalogenated to produce the epoxy resin. It is preferred to keep the temperature below about 120° C.

In the dehydrohalogenation reaction, the reaction temperature, residence time, reactor agitation, amount of additional catalyst, concentration of caustic feed, quantity of caustic feed compared with hydrolyzable chloride in organic feed are all important and are all correlated with each other. The preferred reactor temperature is about 40° to above 80° C. Reactor temperatures operating about 80° C. have the tendency to produce undesirable solid resin polymers and plug the reactor. The additional catalyst is very important to react the 2,1-chlorohydrin (β-chlorohydrin) components and thus is dependent on the 2,1-chlorohydrin contents in the feed. The high limit of catalyst feed to the reactor is from about 0.02 to about 0.08 part by weight per 1 part by weight of organic feed in a typical continuous reactor and preferred at about one-tenth of this range. The caustic concentration can be from about 10% to about 25% but is preferred at about 18% to about 24%. Too high a concentration will cause salt precipitation and too low a concentration will result in less efficiency in reactor operation. The equivalents of alkali metal hydroxide per equivalent of hydrolyzable chloride in the organic feed is determined by the type of reactor, reaction temperature and residence time. In a continuous reactor, the preferred equivalent ratio is from about 1.05:1 to about 1.5:1, while in multi-stage batch reactors it is from about 1.05:1 to about 1.10:1. Too much caustic in the dehydrohalogenation step is economically undesirable and produces undesirable polymers.

The resultant epoxy resin can be recovered by any conventional means, but it is usually recovered by water washing and solvent removal.

The amounts of water, preferably deionized water, required is determined by the efficiency of the washing device and product specifications. The preferred ranges of organic feed to water are 4:1 to about 15:1 by weight. The washing temperature is preferred close to ambient temperature, about 20° to about 50° C. Too much washing water will dissolve more solvent in the aqueous phase. The high temperature limit of the solvent removal system is about 230° C. but it is preferred to remove the solvent at a temperature less than about 200° C.

The following examples are illustrative of the present invention but are not to be construed as to limit the scope of thereof in any manner.

EXAMPLE 1

To a reactor equipped with mechanical agitation and a temperature control device was added a mixture of epichlorohydrin, benzyl trimethyl ammonium chloride as a 60% aqueous solution by weight and bisphenol A in a molar ratio of 9.85:0.013:1, respectively. The reaction temperature was maintained at 55° C. isothermally and the progress of the reaction was monitored by measuring the content of unreacted phenolic OH. The reaction was stopped at 98.2% phenolic OH conversion and the unreacted epichlorohydrin and by-product glycerol dichloride were stripped off using a wipe falling film evaporator at a temperature of 115° C. and a pressure of 20 mm Hg. The stripped resin chlorohydrin intermediate had 8.5% hydrolyzable chloride by the liquid chromatographic method. This stripped intermediate was then dissolved in methyl isobutyl ketone to provide a 40% solution by weight. The dehydrochlorination reaction was carried out in 2 consecutive batches at 80° C. In the first batch reaction, 200 grams of the reactant and 60 grams of 18% NaOH were reacted with agitation for one hour (3600 s) and the aqueous phase was separated at the end of the reaction. In the second batch, forty-five grams of 18% NaOH and 0.15 grams of a 60% solution of benzyl trimethyl ammonium chloride were added to the organic phase from the previous batch and reacted for another 30 minutes (1800 s). The resulting organic phase was rinsed with deionized water twice. The MIBK solvent was removed by a rotary film evaporator using an oil bath as a heat source and maintaining a temperature of 115° C. The resin thus recovered had a viscosity of 8526 cps, hydrolyzable chloride content of 230 ppm, and a color of <1 on the Gardner scale. Additional experiments were carried out similar to the above except the coupling reaction was stopped at different phenolic OH conversions. The results are summarized in Table I.

TABLE I

| Effect of Phenolic OH Conversion on Product Viscosity | | | | |
|---|---|---|---|---|
| Phenolic OH Conversion, % | Hydrolyzable Chloride, ppm | Product Viscosity, cps | High Molecular Weight Polymer Content by L.C., % | Product Color Gardner Scale |
| 95.3 | 460 | 15,166 | 18.77 | <1 |
| 97.0 | 230 | 10,378 | 13.75 | <1 |
| 98.1 | 90 | 8,623 | 11.30 | <1 |

TABLE I-continued

| | | Effect of Phenolic OH Conversion on Product Viscosity | | |
|---|---|---|---|---|
| Phenolic OH Conversion, % | Hydrolyzable Chloride, ppm | Product Viscosity, cps | High Molecular Weight Polymer Content by L.C., % | Product Color Gardner Scale |
| 98.2 | 230 | 8,526 | 11.75 | <1 |
| 98.6 | 40 | 8,228 | 11.20 | <1 |
| 99.4 | 30 | 7,249 | 9.78 | <1 |

EXAMPLE 2

The following example illustrates the effect of temperature on the formation of resin-amine compounds (undesirable) and β-chlorohydrin (undesirable) in the removal of excess epichlorohydrin and by-product glycerin dichlorohydrin. The epichlorohydrin-bisphenol coupling reaction was carried out as in Example 1. The resultant coupled intermediate showed negligible amounts of hydrolyzable chloride from β-chlorohydrin (<150 ppm) and resin-amine compounds (<3 ppm using BTMAC as a standard). The epichlorohydrin removal was carried out using a rotary film evaporator under full vacuum (<10 mm Hg) while varying the oil bath temperatures and residence time. The stripped coupled intermediate was cooled down to ambient temperature immediately. The analytical results of the hydrolyzable chloride from β-chlorohydrin and the resin-amine contents are shown in Table II.

TABLE II

| | Effect of Epichlorohydrin Stripping Temperature on the Formation of 2,1-Chlorohydrin and Resin-Amine | | | | | |
|---|---|---|---|---|---|---|
| | At 100° C. | | At 125° C. | | At 150° C. | |
| Stripping Residence Time, min. | Resin-* amine ppm | Hydrolyz.** chloride from β-CH | Resin-* amine ppm | Hydrolyz.** chloride from β-CH | Resin-* amine ppm | Hydrolyz.** chloride from βCH |
| 5 | 10 | 198 | 12 | 279 | 72 | 495 |
| 10 | 11 | 225 | 14 | 441 | 100 | 1,179 |
| 20 | 11 | 270 | 16 | 657 | 230 | 2,619 |
| 30 | 11 | 315 | 22 | 927 | 560 | 4,023 |
| 45 | 11 | 387 | 32 | 1,287 | 780 | 6,219 |
| 60 | 12 | 432 | 44 | 1,656 | 820 | 7,155 |

*Analyzed by colorimetric method using benzyl trimethyl ammonium chloride as a standard.
**Analyzed by liquid chromatography.

EXAMPLE 3

This example demonstrates that the coupling reaction catalyst, quaternary ammonium compound, also functions well in catalyzing the dehydrochlorination, especially with regards to the 2,1-chlorohydrin (beta) components. The stripped coupled intermediate was obtained similar to Example 1 except higher phenolic OH conversion (>99%) was achieved in the coupling reaction. The total hydrolyzable chloride content, from 1,2-(alpha) and 2,1-chlorohydrins (beta), was 7.39%. The dehydrochlorination reactions were carried out at 80° C. in batch with two caustic (18% NaOH) charges and 20 minutes (1200 s) for each batch. The ratio of eq. NaOH/eq. hydrolyzable chloride for the first batch charge was 1.158. The resultant organic product was divided into 4 equal parts for the second batch. The product after the first batch contained a total hydrolyzable chloride concentration of 5,153 ppm, where 1,058 ppm from 2,1-chlorohydrin (beta) compared with 1,060 ppm in the feed. The second caustic charge (0.386 eq. NaOH/eq. hydrolyzable chloride) was carried out with and without additional benzyl trimethyl ammonium chloride and the results are summarized in the following Table III.

TABLE III

| | Effect of Additional Catalyst on Dehydrochlorination of β-Chlorohydrin | | | |
|---|---|---|---|---|
| Product | Accumulative Ratio[2] Eq. NaOH per Eq. Hyd. Cl | Additional BTMAC Charged[3] ppm | Product Total Hyd. Chloride ppm | Hydrolyzable Cl From β-Chlorohydrin Only[1], ppm |
| Initial Feed | 0 | 0 | 73,924 | 1,060 |
| After 1st. NaOH | 1.158:1 | 0 | 5,153 | 1,058 |
| After 2nd. NaOH | 1.544:1 | 0 | 1,281 | 1,040 |
| After 2nd. NaOH | 1.544:1 | 200 | 85 | 61 |
| After 2nd. NaOH | 1.544:1 | 400 | <50 | <50 |
| After 2nd. NaOH | 1.544:1 | 600 | <50 | <50 |

[1]The hydrolyzable chloride was calculated from product liquid chromatography.
[2]The fed caustic equivalent was compared with the total hydrolyzable chloride of the initial feed which was 73,924 ppm.
[3]Additional benzyl trimethyl ammonium chloride was based on organic weight only.

EXAMPLE 4

This example demonstrates the effect of removing the coupling catalyst prior to removing the excess epichlorohydrin.

A sample of coupled epichlorohydrin-Bisphenol A intermediate prepared as in Example 1 containing 500 ppm catalyst (BTMAC) was divided into two aliquots of 500 ml each. The first aliquot was washed 2 times with 100 ml of deionized water for 3 minutes (180 s) at 40° C. The solution was coalesced after the 2nd wash to remove any entrained water. The resulting benzyltrimethylammonium chloride (BTMAC) concentration was typically less than 200 ppm. Both aliquots (washed and unwashed) were subjected to distillation in the presence of carbon steel filings to remove epichlorohydrin and glycerine dichlorohydrin. The conditions for the final stage of this distillation were 130° and 10 mm Hg vacuum for 30 minutes (1800 s). The aliquots were dissolved in methyl isobutyl ketone (MIBK) to a 30% solids basis and then BTMAC was added to achieve a concentration of 7500 ppm in batch solutions. Each solution was epoxidized 3 times with 130% stoichiometric 25% aqueous sodium hydroxide. The epoxidation conditions were 60° C. for 20 minutes (1200 s). BTMAC was added to the third epoxidation to give a concentration of 2500 ppm. Both solutions were washed 3 times using 100 ml of deionized water per wash. Following the final phase separation of the wash water and the MIBK solution, each aliquot was distilled to remove the MIBK and any other volatiles. The last stage of the distillation was in two steps involving holding the temperature at 150° C. for 15 minutes (900 s) and then raising the temperature to 180° C. and purging for 15 minutes (900 s) with helium. The results are given in Table IV.

TABLE IV

|  | Unwashed | Washed |
|---|---|---|
| Resin Bound Chloride | 0.188% | 0.172% |
| Color (APHA) | 400 | 200 |

We claim:

1. In a process for preparing epoxy resins by (A) reacting at least one polyhydric phenol with an excess of at least on epihalohydrin in the presence of at least one quaternary ammonium catalyst thereby producing a halohydrin intermediate; (B) removing the excess epihalohydrin from said intermediate; (C) adding an organic solvent or mixture of solvents to the resultant intermediate; (D) dehydrohalogenating the intermediate in the presence of said solvent or solvent mixture and (E) thereafter recovering the resultant epoxy resin; the improvement which comprises: (1) conducting step (A) at a temperature below the decomposition temperature of the quaternary ammonium catalyst and for a time sufficient to provide a phenolic hydroxyl conversion of from about 90 to about 99.99 percent; (2) removing substantial quantities of said quaternary ammonium catalyst from the reaction mixture prior to the removal of the excess epihalohydrin and (3) conducting the dehydrohalogenation reaction, step (D), in the presence of added quantities of quaternary ammonium compound in an amount of from about 0.0001 to about 0.02 part by weight per one part by weight of organic feed.

2. A process of claim 1, wherein
   (i) in step (A), the conversion of phenolic hydroxyl groups is from about 95% to about 99%;
   (ii) the quantity of quaternary ammonium catalyst added in step (D) is from about 0.002 to about 0.008 part by weight per one part by weight of organic feed;
   (iii) step (A) is conducted at a temperature of from about 35° C. to about 110° C.;
   (iv) the quantity of catalyst employed in step (A) is from about 0.005 to about 0.15 mole per mole of polyhydric phenol;
   (v) step (D) is conducted at a temperature below about 110° C.; and
   (vi) sodium hydroxide is employed as the dehydrohalogenation agent in a quantity which provides an equivalent ratio of NaOH to hydrolzable chloride of from about 1.05:1 to about 1.5:1 in a continuous reactor and from about 1.05:1 to about 1.1:1 in a multistage batch reactor.

3. A process of claim 2 wherein
   (i) the quantity of quaternary ammonium catalyst added in step (D) is from about 0.002 to about 0.004 part by weight per one part by weight of organic feed;
   (ii) step (A) is conducted at a temperature of from about 40° C. to about 70° C.; and
   (iii) step (D) is conducted at a temperature of from about 40° C. to about 80° C.

4. A process of claim 1, wherein
   (i) said polyhydric phenol is a bisphenol or mixture of bisphenols;
   (ii) said epihalohydrin is epichlorohydrin;
   (iii) said solvent is methyl isobutyl ketone, methyl ethyl ketone, toluene or a mixture thereof; and
   (iv) said quaternary ammonium compound is a quaternary ammonium halide.

5. A process of claim 4 wherein
   (i) said bisphenol A; and
   (ii) said solvent is methyl isobutyl ketone.

6. A process of claim 2 wherein
   (i) said polyhydric phenol is a bisphenol or mixture of bisphenols;
   (ii) said epihalohydrin is epichlorohydrin;
   (iii) said solvent is methyl isobutyl ketone, methyl ethyl ketone, toluene or a mixture thereof; and
   (iv) said quaternary ammonium compound is a quaternary ammonium halide.

7. A process of claim 6 wherein
   (i) said bisphenol is bisphenol A; and
   (ii) said solvent is methyl isobutyl ketone.

8. A process of claim 3 wherein
   (i) said polyhydric phenol is a bisphenol or mixture of bisphenols;
   (ii) said epihalohydrin is epichlorohydrin;
   (iii) said solvent is methyl isobutyl ketone, methyl ethyl ketone, toluene or a mixture thereof; and
   (iv) said quaternary ammonium compound is a quaternary ammonium halide.

9. A process of claim 8 wherein
   (i) said bisphenol is bisphenol A; and
   (ii) said solvent is methyl isobutyl ketone.

* * * * *

UNITED STATES PATENT AND TRADEMARK OFFICE
CERTIFICATE OF CORRECTION

PATENT NO. : 4,582,892
DATED : April 15, 1986
INVENTOR(S) : Feng-chih Chang, et al.

It is certified that error appears in the above—identified patent and that said Letters Patent is hereby corrected as shown below:

Col. 1, line 40, "in" should read --is--.

Col. 4, line 7, "$R_8$" should be --$R^8$--.

Col. 4, line 23, "to" should be --or--.

Col. 5, line 43, "above" should be --about--.

Col. 5, line 44, "about" should be --above--.

Col. 6, line 22, delete the word "of".

Col. 6, line 47, "grams" should be --gram--. (2nd occurrence).

Col. 7, in Table II, under "At 150°C." "from βCH" should be --from β-CH--.

Col. 9, line 6, "130°" should be --130°C--.

Col. 9, line 34, "on" should be --one--.

Col. 9, line 54, "Claim 1," should be --Claim 1--.

Col. 10, line 12, "hydrolyzable" should be --hydrolyzable--.

Col. 10, line 25, "Claim 1," should be --Claim 1--.

UNITED STATES PATENT AND TRADEMARK OFFICE
CERTIFICATE OF CORRECTION

PATENT NO. : 4,582,892
DATED : April 15, 1986
INVENTOR(S) : Feng-chih Chang, et al It is certified that error appears in the above-identified patent and that said Letters Patent is hereby corrected as shown below:

Col. 10, line 34, "said bisphenol" should read --said bisphenol is bisphenol--.

Signed and Sealed this

Twenty-seventh Day of January, 1987

*Attest:*

DONALD J. QUIGG

*Attesting Officer*     *Commissioner of Patents and Trademarks*